United States Patent [19]

Holec

[11] Patent Number: 5,205,536
[45] Date of Patent: Apr. 27, 1993

[54] TOP ENTRY, TRUNNION-TYPE BALL VALVE

[75] Inventor: Edward J. Holec, Hampton, Va.

[73] Assignee: Newport News Shipbuilding and Dry Dock Company, Newport News, Va.

[21] Appl. No.: 950,796

[22] Filed: Sep. 24, 1992

[51] Int. Cl.$^5$ .............................................. F16K 5/06
[52] U.S. Cl. ................................. 251/172; 251/171; 251/174
[58] Field of Search ........................ 251/171, 172, 174

[56] References Cited

U.S. PATENT DOCUMENTS

| | | |
|---|---|---|
| 2,963,262 | 12/1960 | Shafer . |
| 3,445,087 | 5/1969 | Priere et al. .................. 251/172 |
| 3,521,855 | 7/1970 | Jensen . |
| 3,819,150 | 6/1974 | Kajrup . |
| 4,111,393 | 9/1978 | McLurg ........................ 251/174 |
| 4,319,734 | 3/1982 | Acar . |
| 4,401,292 | 8/1983 | Whaley ......................... 251/172 |
| 4,511,150 | 4/1985 | Soguenot ..................... 251/172 X |
| 4,603,836 | 8/1986 | Godfrey . |
| 4,606,368 | 8/1986 | McCafferty . |
| 4,911,413 | 3/1990 | Baba et al. . |

*Primary Examiner*—John C. Fox
*Attorney, Agent, or Firm*—Lalos & Keegan

[57] ABSTRACT

A top entry, trunnion-type ball valve has identical, but oppositely arranged sealing assemblies on both sides of the ball. These sealing assemblies include a seal carriage that holds and maintains in position an annular body seal, an annular ball seal and a resilient O-ring interposed therebetween. The O-ring is located in a cavity between the body seal and ball seal which is open to fluid in the valve through-passage and therefore subject to high pressure in the line. Pressure in the O-ring cavity forces the ball and body seals apart and causes the O-ring to compress and resiliently urge the ball and body seals into sealing engagement with the ball and body, respectively. Angled surfaces formed on the seals enhance sealing by concentrating contact pressures.

21 Claims, 2 Drawing Sheets

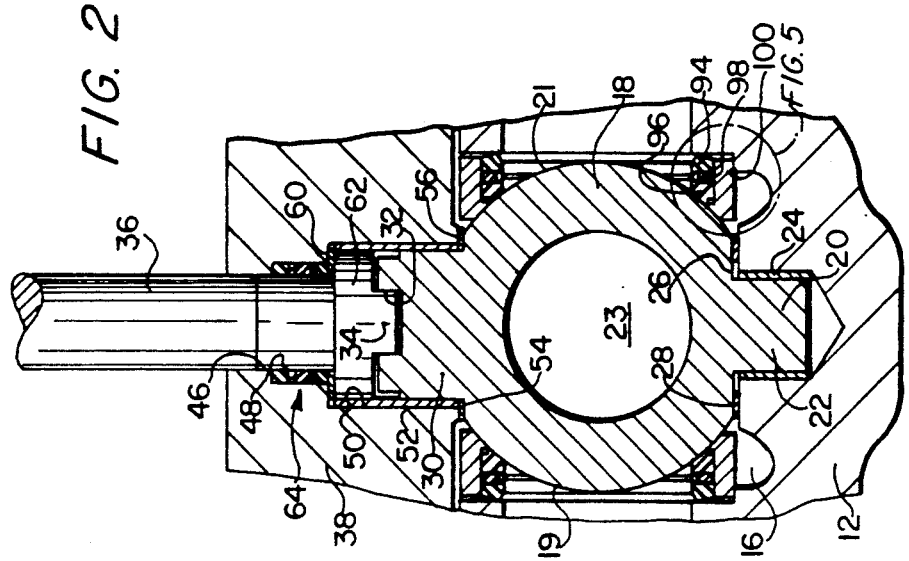
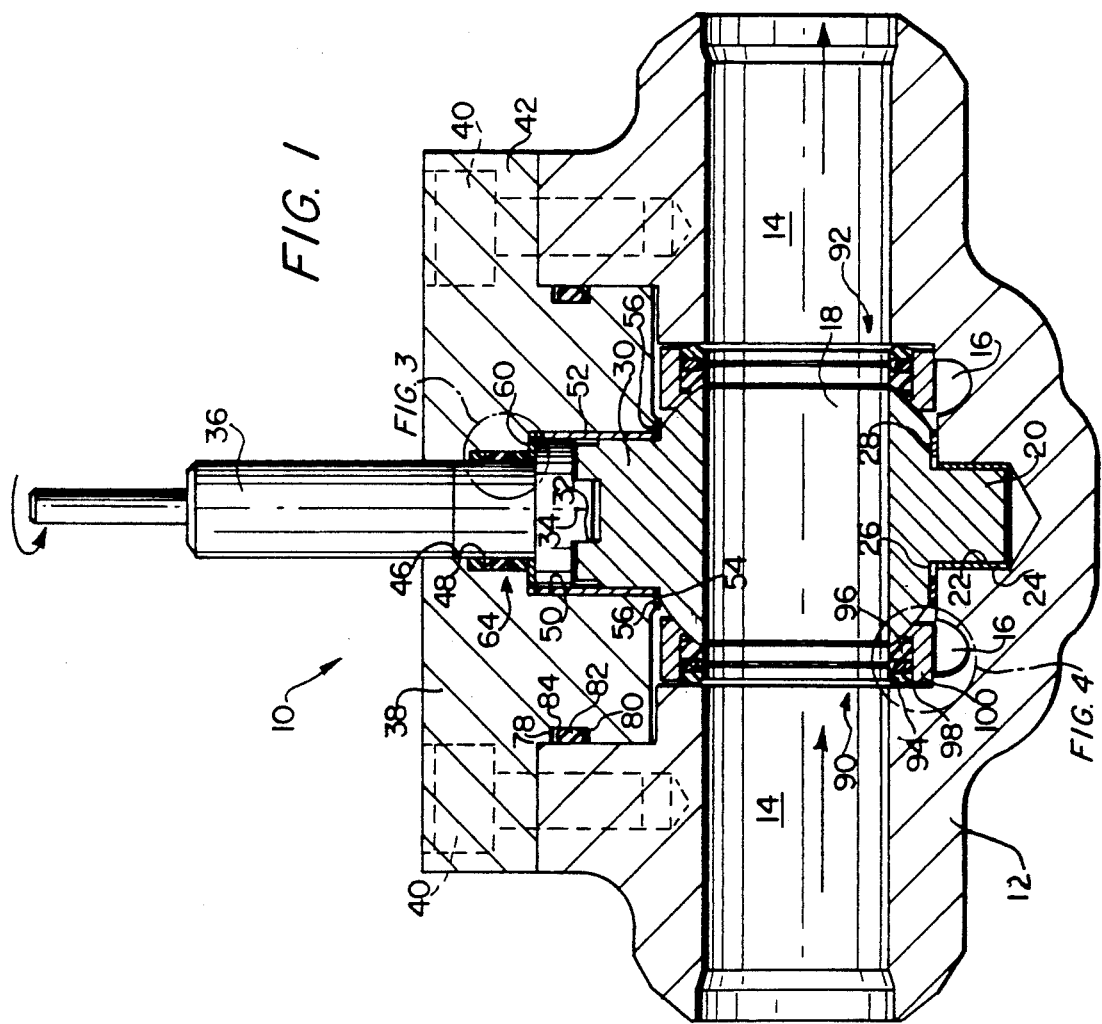

TOP ENTRY, TRUNNION-TYPE BALL VALVE

This invention was made with Government support under Contract N00024-87-C-2046 awarded by Naval Sea Systems Command. The Government has certain rights in this invention.

FIELD OF THE INVENTION

This invention relates to ball valves and more specifically to an improved seal for a high pressure, top entry, trunnion-type ball valve.

BACKGROUND OF THE INVENTION

Ball valves typically include a body with a through passage for fluid flow and a rotary member located in the body, which has a generally spherical shape. The spherical ball member has a through passage and the valve is opened by rotation of the rotary ball member such that the through passage of the ball is in line with the through passage of the body. Conversely, the valve is closed by rotation of the ball member such that the through passages are no longer in alignment. Typically, in the valve closed position the passageway through the ball member is positioned transverse to the through passage of the body. These valves generally fall into one of two categories, a floating ball valve or a trunnion-type ball valve. A trunnion-type ball valve is often preferred because it has a significantly lower operating torque than the floating ball valve since pressure forces tending to push the ball downstream are supported by a trunnion rather than the valve seat. The trunnion may be supported on bearings that do not have to function as a seal and therefore can be made of a material with better frictional properties.

In the trunnion-type ball valve the seals must be pressure activated and can be made smaller with a reduced ball/seal contact area as the seals do not support the massive pressure forces pushing the ball downstream. The pressure activated seal can be designed so that the activating forces are no greater than required to affect a good seal, which can result in an improved seal life.

In certain applications, the trunnion-type valve has an additional advantage in the fact that when the ball valve is in the closed position the upstream seal is under line pressure while the downstream seal is pressure relieving, eliminating the possibility of a pressure lock in the center cavity.

Typically, seals between the valve body and valve ball are spring actuated whereby the seal is biased into compression against the ball, with the spring producing the initial low pressure sealing force. In certain prior art devices, the spring loaded seal and carriage fits into a counterbore in the valve body before assembling the ball. During ball assembly, it is necessary to force the seal back, compressing the spring far enough for the seal to clear the ball when it is assembled in the body. The spring then forces the seal toward the ball to affect a low pressure seal. In such devices, the spring is compressed at assembly well beyond the working load and requires a much lower spring rate. Further, in such devices, the seal carriage must effect a seal with the body and must be made to close tolerances to function at high pressures.

SUMMARY OF THE INVENTION

In the present invention, a resilient, elastomeric O-ring acts as a spring to produce the initial low pressure sealing force. The O-ring is compressed only to its working load as it is assembled into the valve body along with the ball. As a result, the spring (O-ring) can be stiffer and much more compact than prior art devices. In the present invention, the seal is assembled with the ball, and a seal retraction device is not required for ball assembly. All assembly and removal is performed through the valve bonnet. This top entry facility permits valve maintenance and repair without removal of the valve body from the line. The compact design of the valve seal permits a valve bonnet opening that is essentially equal in diameter to the opening required for conventional top entry valves of the floating ball design. This results in a lighter, more compact trunnion-type ball valve.

The sealing assembly of the present invention, which is located on both the upstream side and downstream side of the ball includes a seal carriage that holds and maintains in position an annular body seal, an annular ball seal and an O-ring interposed therebetween. The O-ring is located in a cavity between the body seal and ball seal which cavity is open to fluid in the passageway and therefore subject to high pressure in the line. The ball and body seals are made of a polyamide-imide resin that will expand due to the internal line pressure at a rate that is greater than the metal seal carriage. As these seals attempt to expand they are restrained by the metal seal carriage. Further, pressure forces in the cavity between the two seals tend to force the seals apart further biasing them against the valve body and ball. In addition, the O-ring interposed between the two seals is subject to the pressure in the cavity effecting a seal between the body seal and the seal carriage and between the ball seal and the seal carriage.

The body seal and ball seal are configured with facing annular lips that narrow the cavity holding the O-ring at the end facing the fluid passageway. These annular lips prevent the O-ring from being "sucked" out of the cavity by fast flowing fluid in the line. The body seal and ball seal are each provided with surfaces that form limited areas of contact between the seals, body and ball, thereby concentrating contact pressures in those areas and forming a greater seal.

BRIEF DESCRIPTION OF THE DRAWINGS

FIG. 1 is a vertical sectional view along the flow axis of a trunnion-type ball valve embodying the improved sealing apparatus of the present invention, with the valve in full open position.

FIG. 2 is a fragmentary vertical sectional view showing the valve in full closed position.

DETAILED DESCRIPTION

Figure 3:
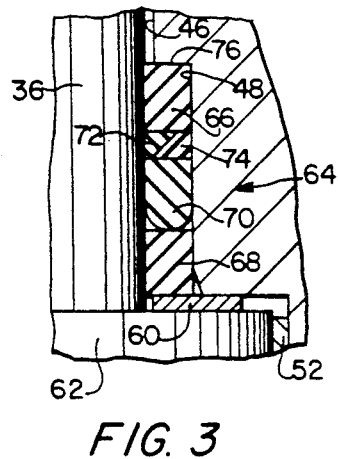
FIG. 3 is an enlarged cross-sectional view of the seal assembly between the valve stem and the valve bonnet.

FIG. 1 shows a ball valve of the trunnion-mounted style and employing the novel valve sealing assembly of the present invention. Trunnion ball valve 10 has a main body portion 12 with a fluid passageway 14 for fluid flow in the direction of the arrows shown, for example. The valve is bidirectional and fluid may flow in either direction or in both directions at different times depending on the specific use of the valve. Within valve body 12 is a chamber shown generally as 16 for receiving the ball 18. In FIG. 1 the valve is shown in the open position and in FIG. 2 the valve is shown in the closed position. As best illustrated in FIG. 2, ball 18 has surfaces 19 and 21 that are portions of a sphere and act to block fluid flow through passageway 14. Ball 18 has a cylindrical hole 23 of substantially the same dimension as fluid passageway 14. When the valve 10 is in the open position (FIG. 1) ball hole 23 and passageway 14 are aligned to permit fluid flow therethrough.

With reference to FIGS. 1 and 2, integral with ball 18 on its lower end is lower trunnion 20 that fits within extension 22 of cavity 16. Lower trunnion 20 is supported within cavity extension 22 by self-lubricating journal bearings 24 that may extend circumferentially around lower trunnion 20. Bearings 24 assist the rotational movement of ball 18 and integral trunnion 20 within cavity 16.

The bottom 26 of ball 18 is supported on body 12 by self-lubricating thrust bearings 28 that may extend circumferentially around the passageway between cavity 16 and cavity extension 22.

Integral with ball 18 on its upper end is upper trunnion 30. A slot 32 in upper trunnion 30 couples with a tang 34 of valve stem 36 so that the action of rotating stem 36 directly rotates ball 18.

Ball 18 with integral trunnions 20 and 30, as well as valve stem 36, are secured in position within valve body 12 by bonnet 38. Bonnet 38 is secured to body 12 by a number of retaining screws 40 (FIG. 1) that extend through flange 42 of bonnet 40 and into body 12. It will be appreciated that bonnet 38 may be substantially circular with valve stem 36 extending through an opening in the center of the bonnet, the opening having three progressively larger diameter sections 46, 48 and 50. Screws 40 will be mounted through generally annular flange 42 about the outer circumference of bonnet 38.

Upper trunnion 30, coupled by tang 34 with valve stem 36, rotates within bonnet opening 50 on self-lubricating journal bearing 52, which may extend circumferentially around opening 50. Bearing 52 also supports the enlarged end of stem 36. Self-lubricating thrust bearings 56 located on the bottom of bonnet 38 provide support for the top 54 of ball 18. Bearings 56 may extend circumferentially around the bottom of bonnet 38 at the entrance to bonnet opening 50.

Additional thrust bearings 60 are provided to support the enlarged end of stem 36. Within bonnet opening 48 is an assembly 64 for providing a fluid seal between stem 36 and bonnet 38 and for providing bearing surfaces for stem 36. This assembly is best described with reference to FIG. 3. It includes upper and lower stem bearings 66 and 68, respectively, which may be made of a polyamide-imide resin such as the product marketed by Amoco Chemicals Corporation under the trademark TORLON. Positioned between bearings 66 and 68 is O-ring 70 which may be a fluorocarbon elastomer, for example. Further, interposed between O-ring 70 and upper bearing 66 is an inner extrusion ring 72 and an outer extrusion ring 74. The components of seal/bearing assembly 64 are maintained in position within bonnet opening 48 by step 76 formed between larger diameter opening 48 and smaller diameter opening 46.

Referring to FIG. 1, a fluid seal between body 12 and bonnet 38 is provided by upper and lower packing retainers 78 and 80, respectively, and O-ring 82 interposed therebetween. O-ring 82 may be a fluorocarbon elastomer, for example. This seal is positioned within annular groove 84 formed in bonnet 38.

Referring again to FIG. 1, in the present invention the unique fluid sealing assembly is provided between body 12 and ball 18 on both sides of ball 18.

Sealing assembly 90 and sealing assembly 92 surround passageway 14 and include identical components, but arranged on opposite sides of ball 18. Each sealing assembly 90,92 includes an annular body seal 94, annular ball seal 96, O-ring 98, and an annular seal carriage 100 that surrounds seals 94 and 96 and O-ring 98 and retains them in position.

Figure 4:
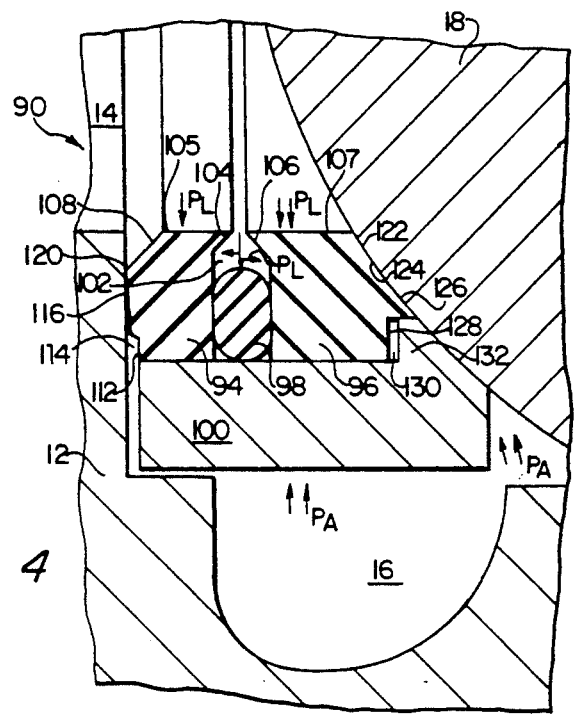
FIG. 4 is an enlarged cross-sectional view of the leftmost valve sealing assembly of FIGS. 1 and 2 with the valve in a closed position and with the source of motive pressure of the fluid on the left.
Figure 5:
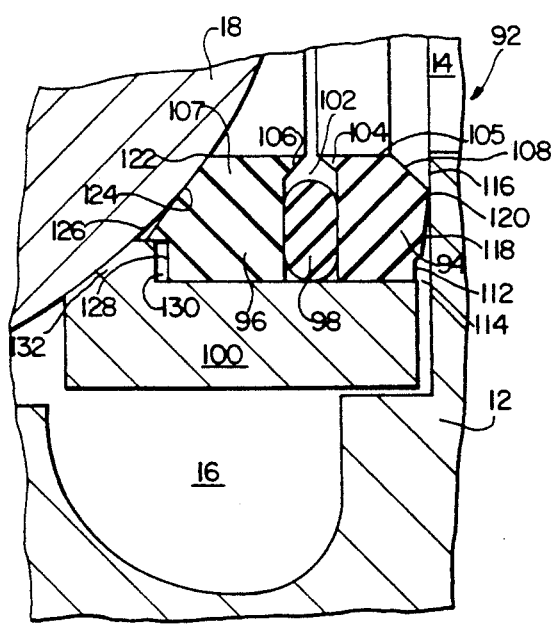
FIG. 5 is an enlarged cross-sectional view of the rightmost valve sealing assembly of FIGS. 1 and 2 with the valve in a closed position and with the source of motive pressure of the fluid on the left.

These assemblies can best be seen with reference to FIG. 4 that illustrates a portion of sealing assembly 90 with ball 18 in the valve closed position and the sealing assembly 90 under line pressure $P_L$ from fluid in passageway 14. FIG. 5 shows sealing assembly 92 with ball 18 shown in the valve closed position and the sealing assembly 92 not under line pressure. FIGS. 4 and 5 illustrate the conditions in effect when the valve is closed and the source of motive pressure of the fluid is on the left.

The inside diameters of body seal 94 and ball seal 96 are generally the same as that of passageway 14. Body seal 94 and ball seal 96 are separated by a distance defined by cavity 102 in which O-ring 98 is located. Cavity 102 narrows at its inner boundary (i.e. near passageway 14) due to the fact that body seal 94 and ball seal 96 are each formed with annular lips 104 and 106, respectively. These lips prevent O-ring 98 from possible extrusion from cavity 102 due to a suction force created by fluid flowing through passageway 14.

Referring to FIG. 4, seals 94 and 96 and O-ring 98 are each subject to line pressures $P_L$ due to the fluid flowing under high pressure in passageway 14. This line pressure tends to force the seals and O-ring away from passageway 14. However, seal carriage 100 is made of metal, for example, and the seals 94 and 96 are made of TORLON, for example, which is a polyamide-imide resin that will expand more readily than the metal of seal carriage 100. Resilient O-ring 98 is made of a fluorocarbon elastomer, for example. Thus, with seals 94 and 96 under line pressure $P_L$, any diametral clearances between the carriage and the seals will be closed by the expansion of the seals. As a result, the clearances may be made larger without concern for extrusion of the O-ring past the seals. Larger clearances, in turn, mean lower manufacturing costs.

Pressures $P_L$ within cavity 102 will tend to force body seal 94 and ball seal 96 away from each other and also force radial outward expansion of O-ring 98, which outward expansion is restricted by metal seal carriage 100. Thus, as O-ring 98 is compressed, it expands radially outward effecting a seal between the body seal and the seal carriage and between the ball seal and the seal carriage. O-ring 98 also expands in the direction of both seals 94 and 96, thereby biasing body seal 94 against and in sealing engagement with ball 18. The contact pressure between the body, ball and their respective seals will be greater than the pressure $P_L$ in cavity 102 forcing the seals apart. O-ring 98 provides a seal between carriage 100 and seals 94 and 96 and resiliently urges seals 94 and 96 against the respective body and ball sealing surfaces. O-ring 98 is made of a material, e.g. a fluorocarbon elastomer, that has greater deformability than seals 94 and 96.

Figure 6:
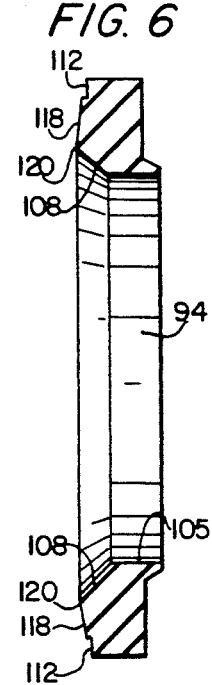
FIG. 6 is an enlarged cross-sectional view of the body seal.
Figure 7:
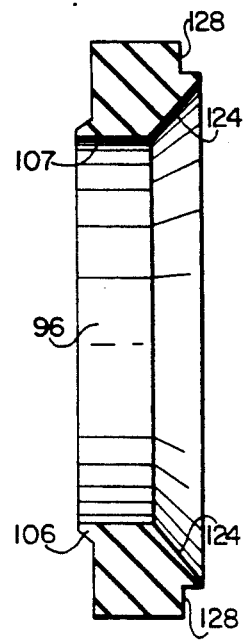
FIG. 7 is an enlarged cross-sectional view of the ball seal.

The specific configurations of seals 94 and 96 present unique advantages. These can be best understood with reference to FIGS. 4 and 5 and also to FIG. 6 which illustrates body seal 94 and FIG. 7 which illustrates ball seal 96. Body seal 94 is formed with an inner chamfer or conical surface 108, which extends out at an acute angle from horizontal toward body surface 116 of body 12. In the context of this description, "horizontal" is intended to mean a line parallel to the longitudinal axis of fluid passageway 14 such as passageway facing surface 105 of body seal 94 or passageway facing surface 107 of ball seal 96. The angle formed between the inner surface 108 and horizontal (i.e. surface 105) is preferably in the range of 40 to 50 degrees and in the preferred embodiment substantially 45 degrees. Notch 112 formed on seal 94 creates a cavity 114 that ensures unbalanced pressure forces, forcing seal 94 toward body 12 when pressure $P_L$ and is greater than pressure $P_A$ and away from body 12 when $P_L$ and less than $P_A$.

An intermediate surface 118 formed on seal 94 extends at an obtuse angle from horizontal (i.e. surface 105) between notch 112 and inner surface 108. This obtuse angle may be in the range of 92 to 100 degrees and in the preferred embodiment is substantially 96 degrees. As will be appreciated, the apex formed at the intersection of surfaces 108 and 118 forms an annular ridge 120 that functions as the body sealing surface of seal 94. This very limited contact area can best be seen in FIG. 5 which illustrates the seal assembly 92 with the valve closed and with the source of motive pressure of the fluid on the left. A line contact between seal 94 and body 12 is formed by ridge 120.

As seal 94 is compressed under line pressure $P_L$ (FIG. 4) the contact pressure between body 12 and seal 94 will be concentrated at ridge 120. Under pressure, ridge 120 will flatten and deform to a certain degree thus forming a greater contact surface, under concentrated pressure, between body 12 and seal 94. This greater contact surface is shown in FIG. 4.

Ball seal 96 is formed with an inner straight line surface 124 that extends at an acute angle from horizontal (i.e. surface 107). Surface 124 is tangent to the ball's spherical surface at the inside diameter 107 of the ball seal. As best shown in FIG. 5, when not under fluid line pressure $P_L$, the contact area 122 between surface 124 and ball 18 will be minimal, and may be confined to an annular tangent line between the straight line surface 124 and the spherical sealing surface 126 of ball 18. As best shown in FIG. 4, when under line pressure $P_L$, the ball seal 96 is compressed and also forced away from seal 94 and toward ball 18. The contact pressure is concentrated at 122 in the area of contact with ball surface 126, which area becomes greater as seal 96 is urged against ball 18. Contact area 122 tends to deform somewhat into the shape of spherical surface 126 under pressure. Although the ball contact surface of seal 96 could be formed as a ridge similar to the body contact surface of seal 94, such a ridge would tend to wear under frictional contact with movement of ball 18, which is rotative.

Ball seal 96 is also formed with notch 128. Notch 128 creates a cavity 130 that ensures unbalanced pressure forces acting on seal 96, forcing seal 96 toward ball 18 when $P_L$ is greater than $P_A$ and away from ball 18 when $P_L$ is less than $P_A$. Flange 132 acts against any dynamic forces tending to force ball seal 96 downstream and it is formed to have no contact or minimal contact with ball 18.

From the foregoing detailed description, it will be appreciated that the advantageous features of the present invention overcome certain deficiencies in the prior art in providing a pressure activated seal for the ball valve. The present invention does not require the expensive manufacturing and assembly processes such as those imposed on prior art devices due to minimum allowable manufacturing tolerances and clearances. Adaptations of the present invention, which will be apparent to those having skill in the art, are intended to be within the scope of the present invention as defined by the following claims.

I claim:

1. A trunnion-type ball valve assembly for use with high pressure fluids in a fluid passageway, comprising
   a trunnion-type ball,
   a valve body for rotatably receiving said ball,
   a sealing assembly being positioned between said ball and said body,
   a seal carriage surrounding said sealing assembly for retaining said sealing assembly in position,
   said sealing assembly including a body seal and a ball seal each surrounding said passageway,
   said body seal having a first body seal surface for sealing engagement with said body, a second body seal surface facing oppositely to said first body seal surface and a third body seal surface facing said passageway,
   said ball seal having a first ball seal surface for sealing engagement with said ball, a second ball seal surface confronting said second body seal surface and forming a first cavity in fluid communication with said passageway and a third ball seal surface facing said passageway,
   a resilient O-ring positioned within said cavity for both sealing engagement with said seal carriage and for resiliently urging said ball seal and said body seal into sealing engagement with said body and said ball respectively upon a pressure from fluid in said fluid passageway.

2. A valve assembly as in claim 1 wherein said body seal and ball seal are each made of a polyamide-imide resin.

3. A valve assembly as in claim 2 wherein said body seal and ball seal are each made of TORLON.

4. A valve assembly as in claim 3 wherein said O-ring is made of a fluorocarbon elastomer.

5. A valve assembly as in claim 1 wherein said body seal and said ball seal are each formed with an annular lip that extends into a portion of said cavity to prevent extrusion of said O-ring into said fluid passageway.

6. A valve assembly as in claim 1 wherein said body seal is formed with an inner surface extending at a first angle from said third body seal surface toward said body.

7. A valve assembly as in claim 6 wherein said body seal is formed with an intermediate surface that meets said inner surface at an annular ridge forming said first body seal surface, whereby contact pressure between said body and said body seal is concentrated at said ridge.

8. A valve assembly as in claim 7 wherein said ridge forms a line contact between said body and said body seal.

9. A valve assembly as in claim 7 wherein said first angle between said inner surface and said third body seal surface is a acute angle.

10. A valve assembly as in claim 9 wherein said first angle between said inner surface and said third body seal surface is in the range of 40 to 50 degrees.

11. A valve assembly as in claim 10 wherein said first angle between said inner surface and said third body seal surface is substantially 45 degrees.

12. A valve assembly as in claim 9 wherein said intermediate surface extends from said inner surface at a second angle in relation to said third body seal surface, said second angle being obtuse.

13. A valve assembly as in claim 12 wherein said second angle is in the range of 92 to 100 degrees.

14. A valve assembly as in claim 13 wherein said second angle is substantially 96 degrees.

15. A valve assembly as in claim 7 wherein said body seal is formed with a notch between said intermediate surface and a fourth body seal surface facing said seal carriage, said notch creating a cavity between said body seal, said body and said seal carriage, whereby unbalanced pressure forces acting on said body seal are ensured.

16. A valve assembly as in claim 1 wherein said ball seal is formed with an inner surface extending at a third angle from said third ball seal surface toward said ball.

17. A valve assembly as in claim 16 wherein said inner surface forms said first ball seal surface and wherein said first ball seal surface contacts said ball at a tangent to a spherical surface of said ball when said sealing assembly is not under pressure from fluid in said passageway.

18. A valve assembly as in claim 16 wherein said ball seal inner surface extends at an acute angle from said third ball seal surface.

19. A valve assembly as in claim 16 wherein said ball seal is formed with a notch, said notch creating a cavity between said ball seal and said seal carriage.

20. A valve assembly as in claim 1 wherein said ball is formed with an upper trunnion and a lower trunnion, said upper and lower trunnions being rotatably supported by journal bearings.

21. A valve assembly as in claim 1 wherein said ball is formed with upper and lower surfaces supported by thrust bearings.

* * * * *